2,785,992
METHOD OF DRYING BULB WALLS FOR ALUMINIZED CATHODE RAY TUBES

Augustine Dabravalski, Livingston, N. J., assignor to Thomas Electronics, Inc., Passaic, N. J., a corporation of New Jersey No Drawing. Application August 31, 1955, Serial No. 531,814

8 Claims. (Cl. 117—33.5)

This invention relates to improvements in manufacturing metal backed screens of luminescent material on solid surfaces, and more particularly relates to a method for obtaining a consistently uniform lacquer base for the metal backing in aluminized cathode ray tubes.

In the manufacture of cathode ray tubes with metal backed screens it is necessary to provide the luminescent screen with a smooth surface prior to deposition of the metallic coating. The conventional method of providing this smooth surface on the screen involves the following steps:

(1) Forming a screen on the tube face plate by the well known gravitational settling method as shown, for instance, in the following patents: 2,619,472; 2,298,968; 2,678,888; and 2,344,081.

(2) Adding water to the tube to a depth sufficient to cover the screen.

(3) Casting a film on the water by allowing a few drops of cellulose nitrate solution or other organic lacquer solution to spread over the surface and harden.

(4) Decanting the water from underneath the film by inclining the tube thus laying the film over the screen surface.

(5) Drying the filmed screen.

In the conventional method of laying the lacquer film over the luminescent screen surface it has been discovered that if the sides of the tube are wet the lacquer solution tends to spread up the water film on the glass in addition to spreading over the surface of the water pool covering the screen. The effect of this spreading up the sides of the tube is to cause uneven stretching of the main film on the water during decantation, which frequently leads to a non-uniform and inadequate coverage of the screen by the film, and a consequent improper base for the aluminum or other metal backing. This has resulting in an exceptionally high percentage of rejects, ranging as high as 10%, which has seriously impaired the commercial value of the process. It will be appreciated that if the tube sides are dry before the lacquer spreading step this problem will not arise, but this may well involve costly expenditure of labor and equipment to dry the tube beforehand and to eliminate splashing of the tube sides whilst adding water for the lacquer cushion. These difficulties have contributed to a trend by manufacturers to resort to spraying the lacquer film directly on the phosphor surface. This is not an entirely satisfactory substitute however, as it often reduces the light output from the screen and may reduce the life of the tube. Attempts have been made to solve the problem through the use of various wetting agents but these have all to a greater or lesser extent preventing the formation of a satisfactory lacquer film.

It is accordingly a primary object of the present invention to provide a low cost method of applying a uniform base for the metal backing in aluminized or other metal backed luminescent screens.

It is another object of this invention to eliminate uneven stretching of the organic film over the phosphor coating in the conventional methods of manufacturing aluminized cathode ray tubes.

It is another object of this invention to prevent the spreading of the organic film up the side walls of the bulb in conventional methods of manufacturing aluminized cathode ray tubes.

It is another object of this invention to provide a uniform and complete lacquer film coverage of the phosphor coating in the manufacture of metal backed cathode ray screens.

I have found that if acetone is applied to the bulb walls shortly before lacquering, the lacquer no longer spreads up the side walls of the tube and uneven stretching of the film with inadequate coverage of the phosphor screen is effectively eliminated. The number of rejects traceable to inadequate screen coverage by the organic film is reduced to an extremely low figure with appreciable savings in the cost of aluminized cathode ray tube manufacture.

According to one method of practicing my invention the acetone is applied to the tube walls prior to the introduction of the lacquer film by directing a fine stream of acetone into the tube neck and allowing the stream to flow down the walls. Approximately 4 milliliters of acetone, applied not sooner than two minutes before lacquering, is effective in a standard 21" cathode ray tube envelope. While it is only necessary to apply the acetone to the pour-off side of the tube the acetone does not deleteriously affect the lacquer filming action and consequently it may be applied around the entire periphery of the bulb and may be sprayed into the bulb.

In addition to its effectiveness with the conventional process described above, wherein a fresh quantity of water is added to the tube, after completion of the screening step, to form a cushion for the lacquer film, my invention is also effective in the shortened process, wherein the lacquer film is applied directly to the screen settling liquid.

In addition to acetone, I have found that methyl ethyl ketone, methyl acetate, ethyl acetate and certain other similar compounds are effective agents in my process. Most organic liquids which do not react with the materials of the tube, leave no residue or evaporation, and are volatile will be efficacious to a greater or lesser extent, but acetone has been found the cheapest and most effective. The compounds, while flowing down the wet glass, modify the property of the water film in such a way that the water drains off rapidly into the main body. The residual amount of solvent dissolved in the main body of cushion water is insufficient to interfere with the subsequent lacquering process.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A process of providing an even lacquer film over a luminescent coating in a bulb comprising the steps of treating at least a portion of the side walls of said bulb with a compound selected from the group consisting of acetone, methyl ethyl ketone, methyl acetate and ethyl acetate, casting a lacquer film upon a liquid in said bulb, and pouring said liquid out of said bulb across the treated portion of said side wall.

2. A process of providing an even lacquer film over a luminescent coating in a bulb comprising the steps of treating at least a portion of the side walls of said bulb with a compound selected from the group consisting of acetone, methyl ethyl ketone, methyl acetate and ethyl acetate, casting a lacquer film upon a liquid in said bulb within approximately two minutes of said coating step, and pouring said liquid out of said bulb across the treated portion of said side wall.

3. A process of providing an even lacquer film over a luminescent coating in a bulb comprising the steps of spraying the side walls of said bulb with a compound selected from the group consisting of acetone, methyl ethyl ketone, methyl acetate and ethyl acetate, casting a lacquer film upon a liquid in said bulb, and pouring said liquid out of said bulb across the treated portion of said side wall.

4. A process of providing an even lacquer film over a luminescent coating in a bulb comprising the steps of treating at least a portion of the side walls of said bulb with acetone, casting a lacquer film on a liquid in said bulb, and pouring said liquid out of said bulb across the treated portion of said side wall.

5. A process of providing an even lacquer film over a luminescent coating in a bulb comprising the steps of spraying the side walls of said bulb with acetone, casting a lacquer film on a liquid in said bulb, and pouring said liquid out of said bulb across the treated portion of said side wall.

6. A process of providing an even lacquer film over a luminescent coating in a bulb comprising the steps of treating at least a portion of the side walls of said bulb with methyl ethyl ketone, casting a lacquer film upon a liquid in said bulb, and pouring said liquid out of said bulb across the treated portion of said side wall.

7. A process of providing an even lacquer film over a luminescent coating in a bulb comprising the steps of treating at least a portion of the side walls of said bulb with methyl acetate, casting a lacquer film upon a liquid in said bulb, and pouring said liquid out of said bulb across the treated portion of said side wall.

8. A process of providing an even lacquer film over a luminescent coating in a bulb comprising the steps of treating at least a portion of the side walls of said bulb with ethyl acetate, casting a lacquer film upon a liquid in said bulb, and pouring said liquid out of said bulb across the treated portion of said side wall.

References Cited in the file of this patent

UNITED STATES PATENTS 2,644,770     Sadowsky _____ July 7, 1953